W. C. LOCKWOOD.
Corn Planter.
No. 105,703. Patented July 26, 1870.
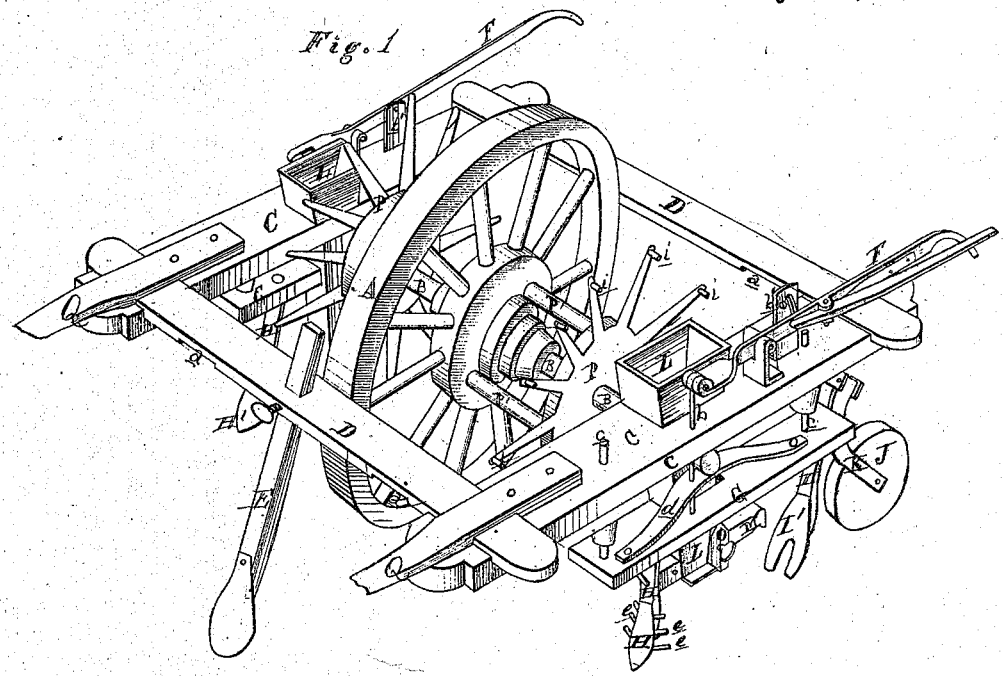
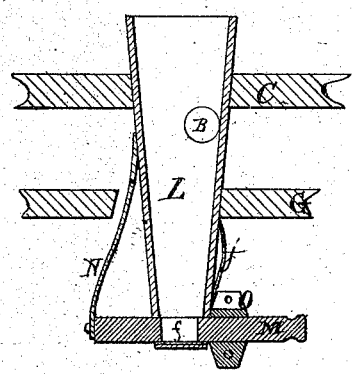
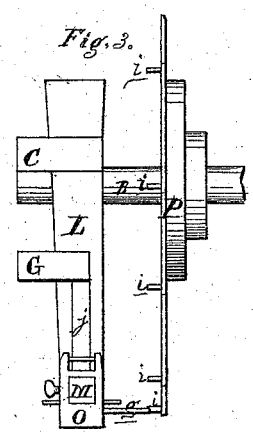

United States Patent Office.

WILBER C. LOCKWOOD, OF SPRING MILLS, MICHIGAN.

Letters Patent No. 105,703, dated July 26, 1870.

IMPROVEMENT IN CORN AND SEED-PLANTERS.

The Schedule referred to in these Letters Patent and making part of the same.

To whom it may concern:

Be it known that I, WILBER C. LOCKWOOD, of Spring Mills, in the county of Oakland and State of Michigan, have invented a new and useful Improvement in Corn and Seed-Planters; and I do declare that the following is a true and accurate description thereof, reference being had to the accompanying drawing and to the letters of reference marked thereon, and being a part of this specification, in which—

Figure 1 is a view, in perspective, of my improvement;

Figure 2 is a detached vertical section of one of the seed-boxes and droppers; and Figure 3 is a rear elevation of the same.

Like letters indicate like parts in each figure.

This invention relates to the construction of a device for planting corn and other seeds in rows each way, at varying distances apart, dropping the seed in said rows at such intervals as may be necessary.

It consists in the peculiar construction and arrangement of the various parts necessary to accomplish this result, in the manner more fully hereinafter set forth.

In the drawing—

A represents a traction-wheel, rotating easily on the fixed axle B, between proper collars thereon, said axle being secured to the dropper-beams C in any convenient manner.

D are transverse bars, secured to the front and rear ends of the dropper-beams, forming, with them, the frame of the device.

If the seed is to be planted in rows four feet apart, the dropper-beams are secured to the ends of the bars, as shown. If less width between rows is desired, the beams are brought toward the wheel, and are secured to the bars in the gains $a$, made in them for that purpose.

E is a double-shovel cultivator-tooth, whose standard is adjustably secured to the front transverse bar in front of the wheel, its office being to level off the ground, and clear sticks or other obstructions in the path of the wheel.

F is a lever, pivoted on each dropper-beam.

To the short arm of this lever a shovel-beam, G, is suspended by a rod, $b$, passing down through the dropper-beam.

The beam G may be raised or lowered in a horizontal plane by the lever, and secured by the dog of the lever entering one of the holes in the quadrant $b'$.

The movement of the beam is guided by guide-pins $c$ passing up through the dropper-beam.

A half-leaf spring, $d$, compels a downward movement of the shovel-beam.

H is a standard, depending from the front end of the beam G, having secured to its lower end a double cultivator-shovel, H', which opens the furrow for the reception of the seed.

$e$ are fenders behind the shovel, which throw aside clods and stones, preventing them from falling back into the furrow.

I is a standard at the rear end of the shovel-beam, having at its lower end a shovel, I', provided with inward-deflecting wings, which cover up the seed in the furrow by scraping in the earth thrown up at the sides of the furrow.

The covering of the seed is completed by a roller, J, journaled in a swivel, K, pivoted to the beams C.

L is a seed-box and spout, projecting downward from the beam C.

In the bottom of the spout is a dropper-slide, M, through which is an opening, $f$, for the passage of the seed.

A spring, N, at the front end of the slide, draws the latter forward, so as to bring the opening within the spout, and prevent the emission of the seed.

O is an adjustable stop on the dropper-slide, regulating the travel toward the front.

$g$ is a stud, projecting from the inner side of the stop toward the wheel.

P is a spider, sleeved on the axle B, and is rotated by the traction-wheel, by being connected therewith by the clutch-pins P' sliding through the hub of the traction-wheel.

The extremities of the spider-arms are provided with adjustable tappets $i$, which engage with and draw back the dropper-slide through its stud $g$ in the rotation of the spider.

When the opening $f$ of the slide is within the spout, it is filled with seed, which, when the slide is drawn out, falls into the furrow.

By adjusting the stop O on the slide from or toward the spout, more or less of the opening is uncovered from the spout, and thus the quantity is gauged.

To prevent the seed from being bruised, the upper part of the opening in which the slide reciprocates, in the back part of the spout, is enlarged, and covered by a light half-spring, $j$, which will give to the seed, if necessary.

There being an even number of arms on the spiders, if all their tappets be adjusted to engage with the stud $g$, seed will be dropped at close intervals; if less are in engagement with it, the intervals between the hills or droppings will be greater.

The thills Q are so secured to the frame as to diverge when the dropper-beams are contracted, in order to admit the horse.

In planting, the attendant walks behind the device, and, by raising the levers on approaching a hollow spot, the shovels will take up a furrow as on level ground, and, on emerging, are readily readjusted to the proper depth of cut, so that no seed is wasted on the surface of low ground or hollow spots.

I claim as my invention—

1. The construction and arrangement of the adjustable dropper-beams C, transverse bars D, axle B, traction-wheel A, spider P, and clutch-pins P', whereby furrows of various distances apart may be planted, substantially as described.

2. The adjustable shovel-beam G, guides c, lever F, quadrant b', and rod b, the standard H, provided with cultivator-shovel H' and fenders e, with the standard I, provided with a winged covering-shovel, I', arranged and operating substantially as and for the purpose set forth.

WILBER C. LOCKWOOD. [L. S.]

Witnesses:
DANIEL B. CHATFIELD,
JEFFERSON CHATFIELD.